United States Patent [19]

Molzahn

[11] Patent Number: 4,839,460

[45] Date of Patent: Jun. 13, 1989

[54] NOVEL POLYMERS FROM AMINATED POLYETHERS AND FORMALDEHYDE

[75] Inventor: David C. Molzahn, Midland, Mich.

[73] Assignee: The Dow Chemical Company, Midland, Mich.

[21] Appl. No.: 160,468

[22] Filed: Feb. 25, 1988

[51] Int. Cl.$^4$ ............................................. C08G 14/02
[52] U.S. Cl. ................................. 528/230; 528/247; 528/266; 528/396; 528/425
[58] Field of Search ............... 528/230, 247, 266, 396, 528/425

[56] References Cited

U.S. PATENT DOCUMENTS

| | | | |
|---|---|---|---|
| 2,792,369 | 5/1957 | Dickson | 252/344 |
| 2,884,459 | 4/1959 | Kirkpatrick et al. | 564/506 |
| 3,639,542 | 2/1972 | Pizzini et al. | 558/105 |
| 3,654,370 | 4/1972 | Yeakey | 564/480 |
| 3,660,319 | 5/1972 | Yeakey | 521/115 |
| 3,729,420 | 4/1973 | Sanders et al. | 252/77 |
| 3,822,113 | 7/1974 | Keenan et al. | 8/169 |
| 3,832,402 | 8/1974 | Yeakey | 564/505 |
| 3,847,992 | 11/1974 | Moss | 564/479 |
| 4,002,598 | 1/1977 | Waddill et al. | 528/110 |
| 4,115,360 | 9/1978 | Schulze et al. | 528/94 |
| 4,116,938 | 9/1978 | Schulze et al. | 528/93 |
| 4,129,716 | 12/1978 | Schulze | 528/68 |
| 4,153,581 | 5/1979 | Habermann | 252/472 |
| 4,178,427 | 12/1979 | Waddill et al. | 528/124 |
| 4,581,418 | 4/1986 | Serratelli et al. | 525/404 |

OTHER PUBLICATIONS

Kirk–Othmer, "Encyclopedia of Chemical Technology", John Wiley & Sons, Inc., vol. II (1980), p. 235.

Primary Examiner—John Kight
Assistant Examiner—S. A. Acquah

[57] ABSTRACT

A process for the preparation of novel polymers comprises reacting a primary polyether polyamine of the formula $$A(E_pNH_2)_m,$$

wherein A is the residue of a polyether initiator having m initiator groups, E is an ether moiety from an oxirane compound, p is 5–90 and m is 2–8; with an aqueous solution of formaldehyde or with paraformaldehyde in the absence of a diluent.

23 Claims, No Drawings

NOVEL POLYMERS FROM AMINATED POLYETHERS AND FORMALDEHYDE

TECHNICAL FIELD

This invention relates to a process for the preparation of novel polymers by reaction between formaldehyde and one or more primary polyether polyamines.

BACKGROUND ART

Yeakey has proposed, in U.S. Pat. Nos. 3,660,319 and 3,832,402, the preparation of tertiary polyoxyalkylene polyamines by reaction between an aldehyde and a polyoxyalkylene polyamine, followed by hydrogenation of the product. The reaction with formaldehyde, in methanol solvent, is reported to give similar results.

The reaction between a primary alkylamine, e.g. methylamine, and formaldehyde, as recited in Kirk-Othmer, "Encyclopedia of Chemical Technology," John Wiley & Sons, Inc., vol. 11 (1980), page 235, results primarily in formation of a trimer, by condensation of an intermediate N-methyol compound. The proposed reaction sequence is:

$$3HCHO + 3CH_3NH_2 \longrightarrow 3[CH_3NHCH_2OH]$$

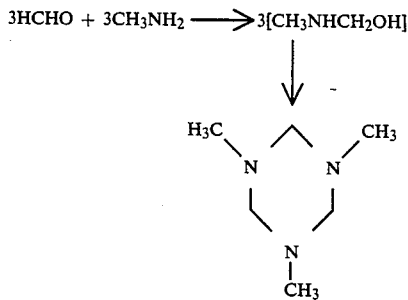

It is object of this invention to provide novel polymer compositions, based on primary polyether polyamines. The products can be used as resins or adhesives.

SUMMARY OF THE INVENTION

In a preparative aspect, this invention relates to a process for preparing polymers by reaction between a primary polyether polyamine of the formula $$A(E_pNH_2)_m$$

wherein A is the residue of a polyether initiator having m initiator groups, E is an ether moiety from an oxirane compound, p is 5–90 and m is 2–8; with an aqueous solution of monomeric formaldehyde or with paraformaldehyde in the absence of a diluent.

More specifically, this invention relates to a process for preparing polymers, comprising reacting a primary polyether polyamine of the formula $$A[(OC_nH_{2n})_pNH_2]_m$$

wherein A is the residue of a polyether initiator having m initiator groups, n is 2–4, p is 5–90 and m is 2–8; with an aqueous solution of monomeric formaldehyde or with paraformaldehyde in the absence of a diluent.

In another aspect, this invention relates to polymers prepared by the foregoing reactions.

DETAILED DESCRIPTION OF THE INVENTION

Primary polyether polyamines, used as starting materials in the process of this invention include, but are not limited to, primary polyether polyamines derived from polyahls. The term "polyahl," as used herein, includes any polyfunctional compound having at least two active hydrogen atoms. The number of initiator groups, m, in the generic formulas herein corresponds to the number of active hydrogens in the polyahl used to make the intermediate polyether.

An active hydrogen means a hydrogen atom which, because of its position in the molecule, has significant activity by the Zerewitinoff test. Representative active hydrogens are those in the —COOH, —OH, —NH$_2$, —NH—, —CONH$_2$, —SH or —CONH— groups. Therefore, polyahls include, but are not limited to, polyols, polyamines, polyamides, polymercaptans and polyacids. Of the foregoing, polyols and polyamines are preferred initators for making polyether polyols.

Polyols include glycols, such as ethylene glycol, 1,2-propylene glycol, 1,3-propylene glycol, 1,4-butylene glycol, 1,3-butylene glycol, 1,2-butylene glycol, 1,5-pentanediol, 1,7-heptanediol, etc. as well as alcohols having more than two hydroxyl groups. Representative of these polyols are glycerol, 1,2,3-butanetriol, erythritol, pentaerythritol, 1,1,1-trimethylolpropane, 1,1,1-trimethylolethane, 1,2,6-hexanetriol, mannitol, sorbitol, alpha-methylglucoside, and the like. Also included within the term polyhydric alcohol are the simple sugars, such as glucose, sucrose, fructose and maltose and phenolic compounds, including 2,2-[4,4'-bis(hydroxyphenyl)]propane, otherwise known as bisphenol A. Water is also considered a polyol for the purposes of this invention.

Polyols also include polyol polyesters, hydroxy-functional acrylic polymers, polyhydroxyl-containing polyurethane polymers, polyhydroxy-containing phosphorus compounds, alkylene oxide reaction products of polyhydric thioethers, polyalkylene carbonate polyols, mercaptolkanols, and aminoalcohols. Typical aminoalcohols include diethanolamine, triethanolamine, diisopropanolamine, triisopropanolamine and the like.

Polyhydroxy-containing phosphorus compounds which can be used include compounds disclosed in U.S. Pat. No. 3,639,542, herein incorporated by reference.

Polyacetals include reaction products of formaldehyde or other aldehydes with polyhydric alcohol. Similarly, ketals can be obtained by reaction with a ketone, such as acetone.

Thiols useful as the polyether initiator can include alkane thiols, e.g., 1,2-ethane dithiol, 1,2-propane dithiol, 1,3-propane dithiol, 1,6-hexane dithiol, 2-butene-1,4-dithiol, 3-hexyne-1,6-dithiol and 1,6-benzene dithiol. Hydrogen sulfide is considered a to be thiol for the purpose of initiating polyether polyols used in the practice of this invention.

Acidic compounds which can be used as polyether initiators include difunctional fatty acids, e.g. hydroxystearic acid, fatty acid alkanolamides, adipic acid, terephthalic acid, succinic acid, isophthalic acid, trimellitic acid, etc.

Amine polyahls which can be used as polyether polyol initiators include polyamines, e.g. p-phenylene diamine, o-phenylene diamine, 1,5-diaminopentane, 1,6-diaminohexane, methylene dianiline, 1,5-diaminonaphtalene, ethylene diamine, diethylene triamine, the butylene diamines, bis(aminoalkyl)piperazines, such as bis(2-aminoethyl)piperazine, and mixtures thereof.

Polyol polyesters useful as polyether initiators are those derived from polycarboxylic acids and polyols, so that an excess of hydroxyl function is present at the conclusion of the condensation. Polycarboxylic acids useful for making polyol polyesters include, but are not limited to, oxalic acid, malonic acid, succinic acid, glutaric acid, adipic acid, pimelic acid, suberic acid, azelaic acid, maleic acid, fumaric acid, glutaconic acid, the hydromuconic acids, phthalic acid, isophtalic acid, terephthalic acid, trimellitic acid, hemimellitic acid, 1,4-cyclohexane dicarboxylic acid and substituted deviatives and isomers of the foregoing acids and their homologues. The polyols useful in making polyester polyols are those disclosed above.

Another polyether initiator, useful in the practice of this invention, is a bis(aminoalkyl)polyurea or diamino-terminated polyurea. These compounds are made by reaction between a diamine and urea, phosgene or diphenyl carbonate, as set forth in U.S. Pat. Nos. 4,002,598; 4,115,360, 4,116,938 and 4,178,427, herein incorporated by reference. Chain extension with an oxirane compound is carried out as for other polyether initiators to produce, after amination, diamino polyalkylene ether polyureas.

Preferred polyether initiators for the practice of this invention are those derived from a polyol or a polyamine. Most preferably, the polyether initiator is a glycol.

The polyahl or polyether initiator is reacted with an oxirane compound, such as ethylene oxide, propylene oxide, butylene oxide, epichlorohydrin, styrene oxide or amylene oxide; a glycidyl ether, such as t-butyl glycidyl ether or phenyl glycidyl ether or with mixtures of oxiranes to produce random or block copolymeric polyether polyols.

In the specification and claims, E means an either moiety from an oxirane compound, for example, E from ethylene oxide is $-CH_2CH_2O-$, from propylene oxide is $-C_3H_6O-$ and from styrene oxide is $-OCH(C_6H_5)CH_2-$.

Primary polyether polyols of the formula $A[-(OC_nH_{2n})_pOH]_m$ can have primary, secondary or tertiary hydroxyl groups. Preferably, the polyether polyols are prepared from ethylene, propylene or butylene oxides and p is 2–4, including mixtures thereof.

The polyether polyols can be prepared generally as disclosed by Serratelli et al., U.S. Pat. No. 4,581,418, herein incorporated by reference. Other polyether initiators are prepared as recited in Moss (U.S. Pat. No. 3,847,992), Keenan et al. (U.S. Pat. No. 3,822,113), Sanders et al. (U.S. Pat. No. 3,729,420), Kirkpatrick et al. (U.S. Pat. No. 2,884,459) and Dickson (U.S. Pat. No. 2,792,369), herein incorporated by reference.

The polyether polyols are converted to primary aminated polyether polyamines by reaction with ammonia, as described in U.S. Pat. Nos. 3,654,370 and 4,153,581, herein incorporated by reference.

It has been found that complete amination of the polyether polyols is not required for the purposes of this invention. It is preferred to use aminated polyether polyols, in which amination is at least 90% of theoretical. Most preferably, the extent of amination is at least 95% of theoretical.

In a most preferred embodiment, the primary polyether polyamine is of the formula

wherein A' is the residue of a glycol and n is 2 or 3.

The initial condensation reaction of a polyether polyamine with formaldehyde can be represented by the equation:

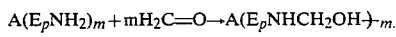

The N-methylol intermediates can undergo further condensation when, for example, A is a difunctional compound, to produce linear polymers. The linear polymers are thought to be characterized by the unit formula

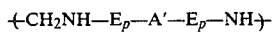

wherein A' is the residue of a polyether initiator having two initator groups (m=2). The resulting linear polymer can undergo condensation with uncondensed units of the formula $A'(E_p-NH-CH_2OH)_2$ for form a network, crosslinked by triazine rings. This product can be represented by the formula

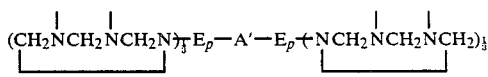

When the polyether initiator is a glycol and the epoxide moieties are derived from ethylene oxide, propylene oxide or butylene oxide, the unit formula can be represented as:

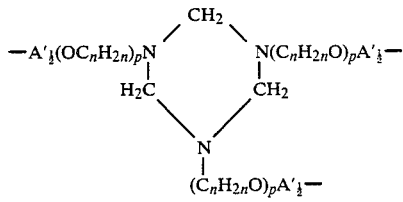

wherein A' is the residue of a glycol and n is 2–4. Polymers of this unit formula are among the most preferred polymers of this invention.

Polymers prepared by reaction between formaldehyde and a primary polyether polyamine, derived from an initiator in which m is 3 or greater can produce a crosslinked network without trimerization through triazine rings. For example, the reaction product from formaldehyde and a trifunctional polyether polyamine, represented by $A''(E_pNH_2)_3$, wherein m=3, can correspond to the unit formula

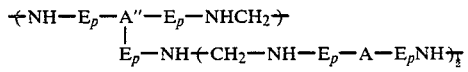

These materials can undergo further condensation through trimerization, as well as by crosslinking inherently possible using polyether initiators, in which m is 3 or greater.

In carrying out the process of this invention, formaldehyde is used either in its monomeric form in aqueous solution or as paraformaldehyde in the absence of a diluent. It is preferred to use aqueous solutions of formaldehyde, particularly those in which the concentration of formaldehyde is more than about 35% by weight. It has been found that concentrated aqueous solutions of formaldehyde give almost instantaneous condensation or polymerization reactions, after combination with the primary polyether polyamine.

It will be understood that aqueous formaldehyde solutions frequently contain an inhibitor for polymerization of formaldehyde. Methanol is commonly used for this purpose. However, aqueous solutions used in the practice of this solution should not contain methanol, beyond amounts which inhibit polymerization of formaldehyde, even under ambient conditions.

When paraformaldehyde is used in the process of this invention, it is preferred to heat the reaction mixture slightly to initiate condensation or polymerization. Heating to about 70°–75° C. is preferred.

The process of this invention is preferably carried using 0.75–1.75 equivalent of formaldehyde per equivalent of primary amine. It has been found that tacky substances, which are useful as adhesives, are obtained at ratios of formaldehyde to amine below about 1. In order to obtain resinous, rubbery products, it is preferred to use formaldehyde:amine ratios near 1, preferably 1.2:1 to 1:1.

The polymers of this invention can be prepared at room temperature, particularly when aqueous solutions of formaldehyde are used. However, curing of the polymers can be accelerated by heating the low-melting intermediate condensation products to their melting points.

Best Mode for Carrying Out the Invention

In a most preferred aspect, the process of this invention is that wherein the a primary polyether polyamine of the formula $$A'[(OC_nH_{2n})_pNH_2]_2$$

wherein A' is the residue of a glycol, n is 2 or 3 and p is 5–90, with formaldehyde at a ratio of 0.75–1.75 equivalent of formaldehyde per equivalent of primary polyether polyamine.

In a most preferred aspect, the polymer is of the unit formula $$+CH_2NH(C_nH_{2n}O)_p-A'-(OC_nH_{2n})_pNH+$$

or is of the unit formula

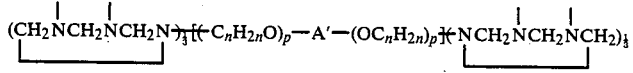

wherein n is 2 or 3 and p is 5–90.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, temperatures are set forth uncorrected in degrees Celsius. Unless otherwise indicated, all parts and percentages are by weight.

EXAMPLE 1

Aqueous formaldehyde (37%, 3.0 g) is added to 20 g of animated polyether (aminated P-1200, an amine-terminated polyoxypropylene, molecular weight 1200, equivalent weight 600, 97.5% aminated). The resulting two-phase system is stirred to mix the reactants. Stirring is continued until the mixture turns milky white. The polymer is cast, and left undisturbed.

A polymer prepared in this way can be removed from the mold in less than 5 minutes, although full cure may require 24 h. During the curing process, the polymer changes from milky white to clear.

Vacuum treatment of the polymer after its initial set up, using a vacuum pump at about 5 mm of Hg, produces a rubbery foam.

Heating the polymer at about 60° C. shortens the curing time and appears to increase the rate at which water diffuses out of the polymer.

EXAMPLE 2

Aqueous formaldehyde (3.0 g, 37%) is added to a beaker containing 20 g of aminated P-1200 and the resulting mixture is stirred. An exothermic reaction occurs and the viscosity of the mixture increases. The mixture is allowed to stand at room temperature. Within about 5 minutes after the reactants are combined, the product sets up. Within about 15 minutes after combining the reactants, the resulting milky white solid can be removed from the beaker without loss of its shape. The product is rubbery. The resilient mass bounces, and rebounds to about 70% of its initial height.

EXAMPLE 3

Polymer is prepared as in Example 2, except that the reactants are mixed very rapidly and very thoroughly. The mixture is allowed to stand in a small hexagonal weighing dish. After a weekend at room temperature, the product retains the shape of the hexagonal mold, from which it is removed. The top of the molding is clear.

The molding is transferred to an oven. It melts at about 110° C., and is converted to clear, slightly tacky product.

EXAMPLE 4

Polymer is prepared by reaction between 0.5 g of paraformaldehyde and 10 g of aminated P-1200. Mild heating is required to initiate polymerization. The resulting polymer is rubbery, but somewhat tacky. Products, obtained at low ratios of formaldehyde to amine, can therefore be used as adhesives.

EXAMPLE 5

Aminated polyoxypropylene glycol (P-2000, molecular weight 2000, equivalent weight 1000) is reacted with 37% formaldehyde as above. Similar results are obtained.

EXAMPLE 6

Polyoxyethylated glycerol (about 5 ethylene oxide units/OH) is reacted with paraformaldehyde as in the foregoing examples. A resinous product is obtained.

EXAMPLE 7

Polyoxypropylated triethanolamine (about 10 moles of propylene oxide/OH) is reacted with 37% aqueous formaldehyde solution as above. A resinous material is obtained.

EXAMPLE 8

Polyalkylene ether polyurea diamine (molecular weight 2070) is reacted with 37% aqueous formaldehyde solution. A resinous product is obtained.

The preceding examples can be repeated with similar success by substituting the generically or specifically described reactants and/or operating conditions of the invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. A process for preparing polymers, comprising reacting a primary polyether polyamine of the formula $$A(E_pNH_2)_m$$

wherein A is the residue of a polyether initiator having m initiator groups, E is an ether moiety from an oxirane compound, p is 5–90 and m is 2–8, with an aqueous solution of monomeric formaldehyde or with paraformaldehyde in the absence of a diluent.

2. The process of claim 1, wherein the primary polyether polyamine is of the formula $$A[(OC_nH_{2n})_pNH_2]_m$$

and n is 2–4.

3. The process of claim 1, wherein the formaldehyde solution contains more than 35% by weight of formaldehyde and is free of methanol, other than that present as a polymerization inhibitor.

4. The process of claim 1, wherein paraformaldehyde is used in the absence of a diluent.

5. The process of claim 1, wherein 0.75–1.75 equivalent of formaldehyde is used for each equivalent of primary polyether polyamine.

6. The process of claim 2, wherein n is 2 or 3.

7. The process of claim 2, wherein m is 2.

8. The process of claim 2, wherein n is 2 or 3 and m is 2.

9. The process of claim 1, wherein the polyether polyamine is aminated to at least 90% of theoretical.

10. The process of claim 1, wherein the polyether polyamine is animated to at least 95% of theoretical.

11. The process of claim 1, comprising reacting a primary polyether polyamine of the formula $$A'[(OC_nH_{2n})_pNH_2]_2$$

wherein A' is the residue of a difunctional polyether initiator, with formaldehyde at a ratio of 0.75–1.75 equivalent of formaldehyde per equivalent of primary polyether polyamine.

12. The process of claim 1, wherein A' is the residue of a glycol.

13. The process of claim 11, wherein the polyether polyamine is aminated to at least 95% of theoretical.

14. The process of claim 1, including the further step of heating a resulting intermediate condensation product.

15. A polymer prepared by the process of claim 1.

16. A polymer prepared by the process of claim 1, having the unit formula $$+CH_2NH-E_p-A'-E_p-NH+$$

wherein A' is the residue of a polyether initiator having two initiator groups.

17. The polymer of claim 15, wherein A' is the residue of a glycol, E is $C_nH_{2n}O$ and n is 2–4.

18. The polymer of claim 18, wherein n is 2 or 3.

19. The polymer of claim 16, wherein A' is the residue of a glycol.

20. The polymer prepared by the process of claim 1, having the unit formula $$(CH_2NCH_2NCH_2N)_{\frac{1}{3}}E_p-A'-E_p(NCH_2NCH_2NCH_2)_{\frac{1}{3}}$$

wherein A' is the residue of a difunctional polyether initiator.

21. The polymer of claim 20, wherein A' is the residue of a glycol.

22. The polymer of claim 21, having the unit formula $$-A'_{\frac{1}{3}}(OC_nH_{2n})_pN\begin{array}{c}CH_2\\ \diagup \quad \diagdown \\ H_2C \quad\quad CH_2 \\ \diagdown \quad \diagup \\ N \\ | \\ (C_nH_2{}_nO)_pA'_{\frac{1}{3}}-\end{array}N(C_nH_{2n}O)_pA'_{\frac{1}{3}}-$$

wherein n is 2–4.

23. The polymer of claim 22, wherein n is 2 or 3.

* * * * *